Figure 1:
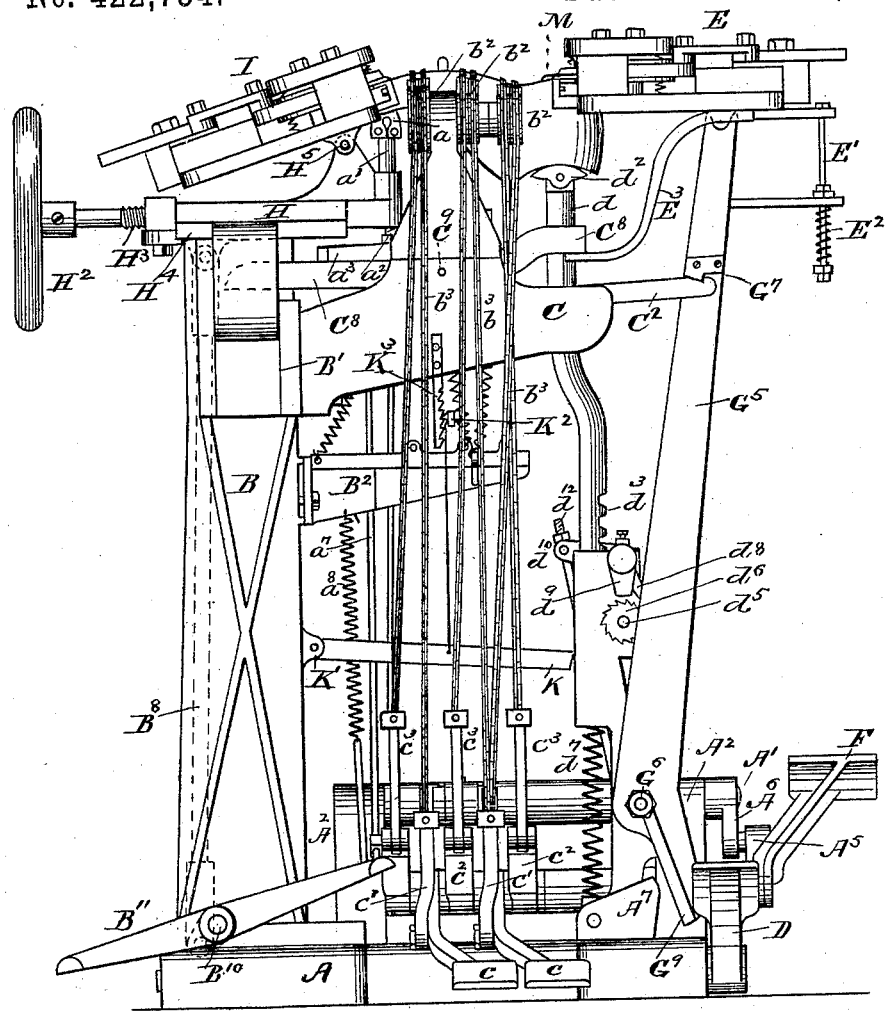

(No Model.) 9 Sheets—Sheet 1.

G. W. COPELAND & J. E. CRISP.
LASTING MACHINE.

No. 422,734. Patented Mar. 4, 1890.

WITNESSES.
INVENTORS.

(No Model.) 9 Sheets—Sheet 2.
G. W. COPELAND & J. E. CRISP.
LASTING MACHINE.
No. 422,734. Patented Mar. 4, 1890.
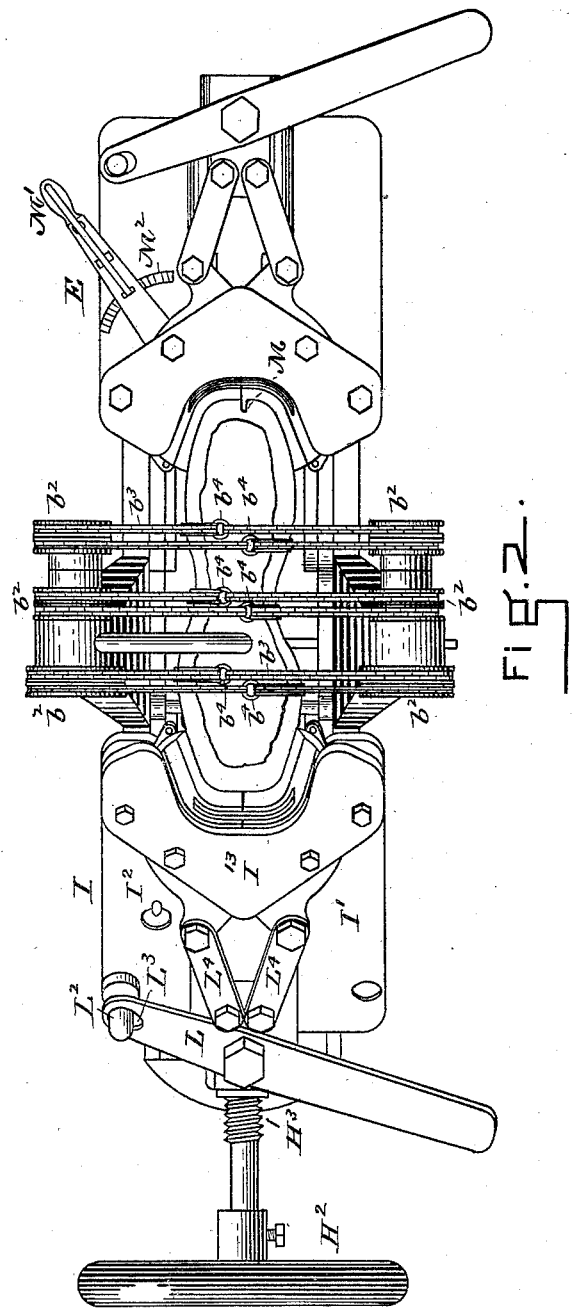
WITNESSES.
Mary E. Woodburn
John L. S. Roberts
INVENTORS.
Geo. W. Copeland
Jas. E. Crisp (No Model.) 9 Sheets—Sheet 3.
G. W. COPELAND & J. E. CRISP.
LASTING MACHINE.
No. 422,734. Patented Mar. 4, 1890.
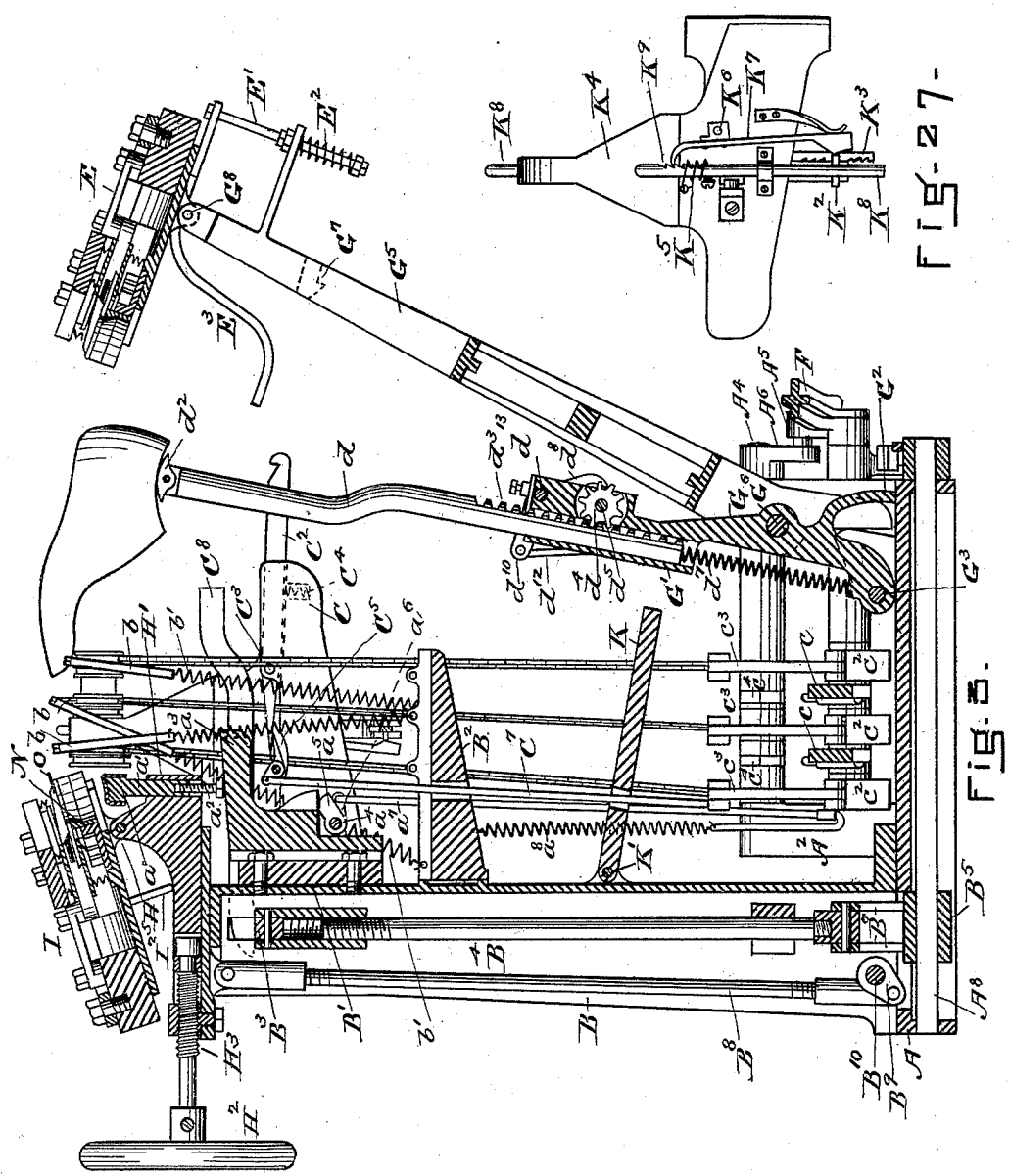
WITNESSES.
Mary E. Woodburn
John L. S. Roberts
INVENTORS.
Geo. W. Copeland
Jas. E. Crisp (No Model.) 9 Sheets—Sheet 4.

G. W. COPELAND & J. E. CRISP.
LASTING MACHINE.

No. 422,734. Patented Mar. 4, 1890.

WITNESSES
Mary E. Woodburn
John L. S. Roberts

INVENTORS
Geo. W. Copeland
Jno. E. Crisp (No Model.) 9 Sheets—Sheet 5.

G. W. COPELAND & J. E. CRISP.
LASTING MACHINE.

No. 422,734. Patented Mar. 4, 1890.

WITNESSES.
Mary E. Woodburn
John L. S. Roberts

INVENTORS.
Geo. W. Copeland
Jos. E. Crisp

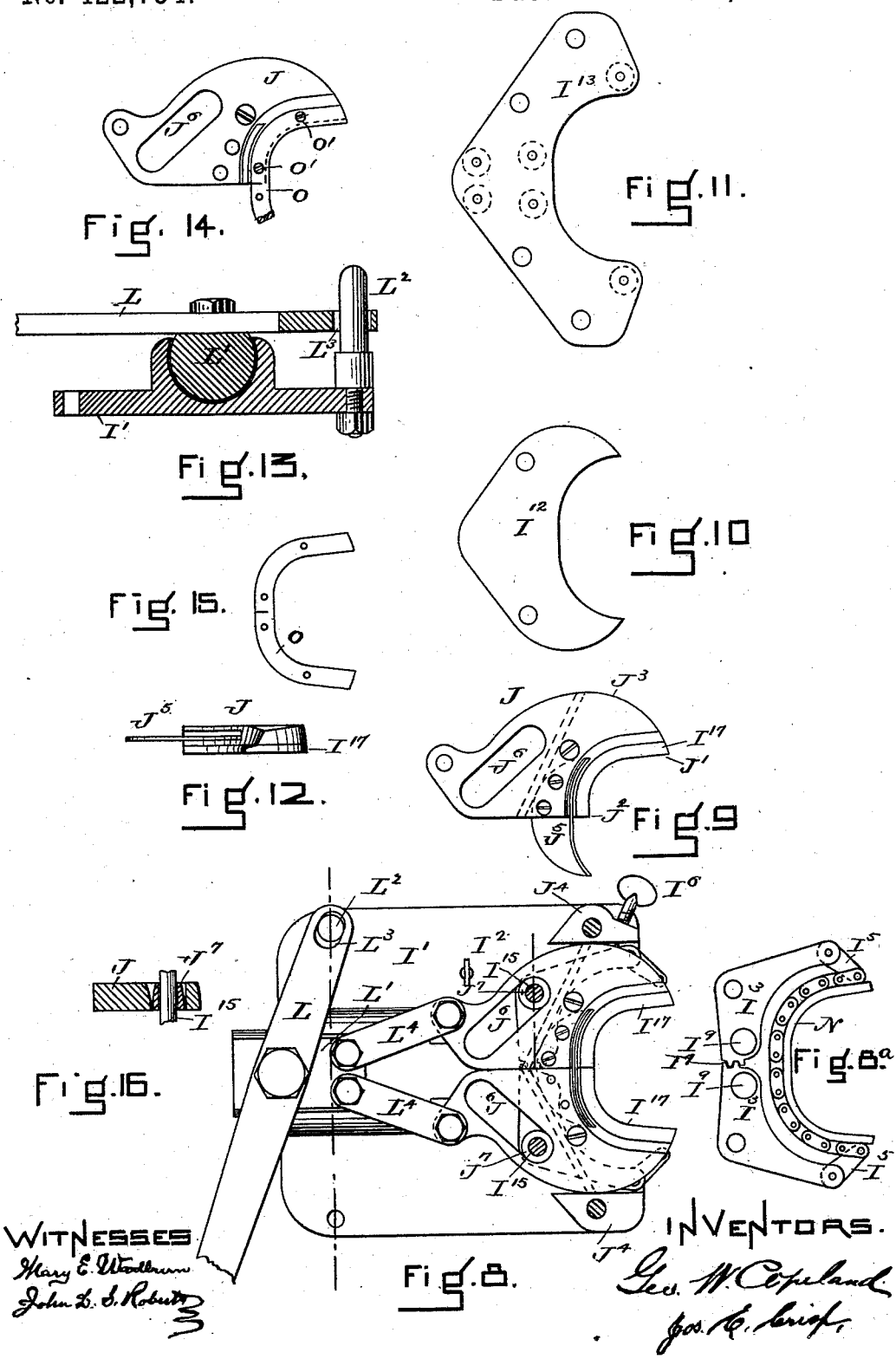

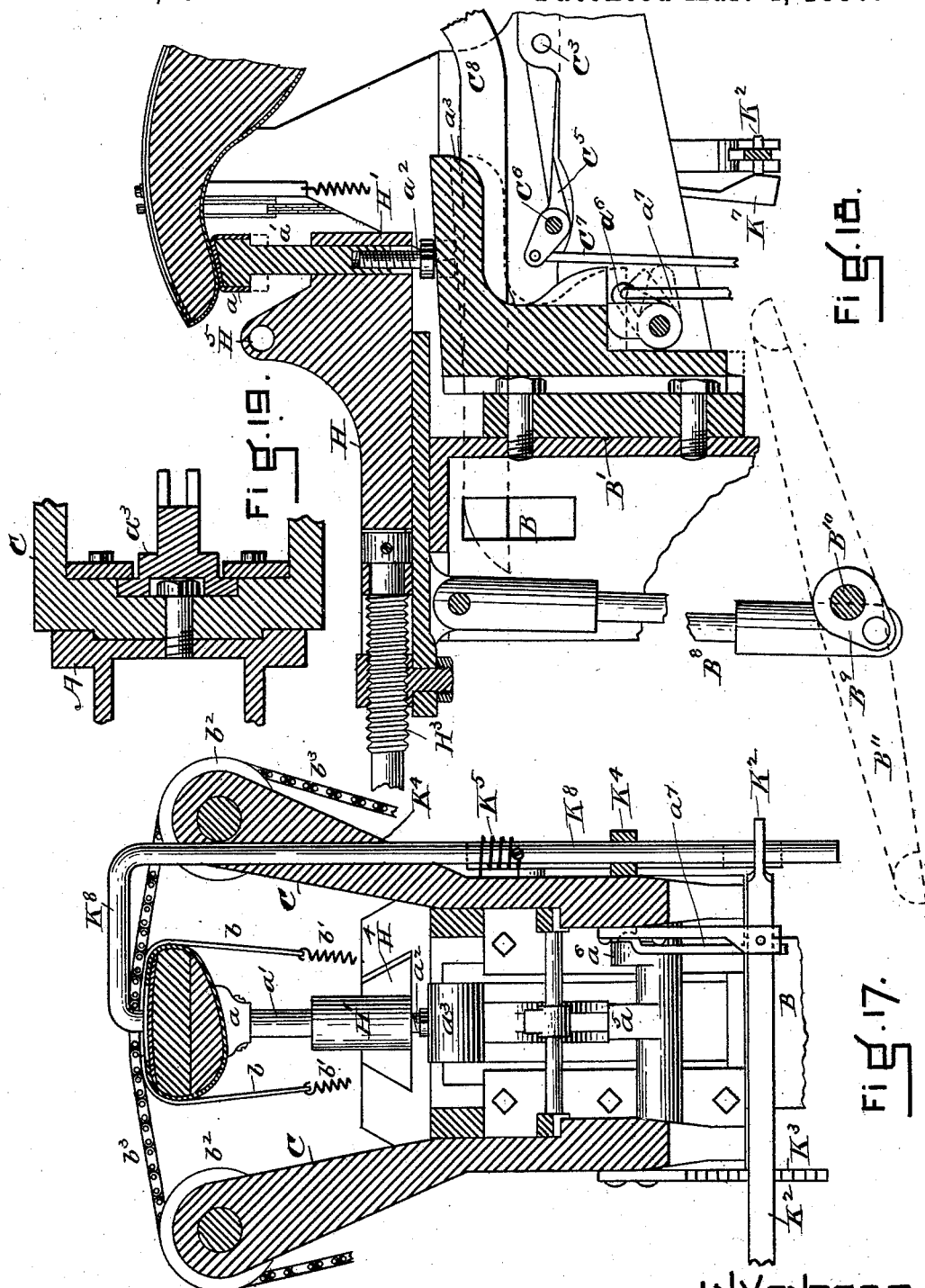

(No Model.) 9 Sheets—Sheet 8.

G. W. COPELAND & J. E. CRISP.
LASTING MACHINE.

No. 422,734. Patented Mar. 4, 1890.

WITNESSES

INVENTORS.
Geo. W. Copeland
Jos. E. Crisp

UNITED STATES PATENT OFFICE.

GEORGE W. COPELAND, OF MALDEN, AND JOSEPH E. CRISP, OF SOMERVILLE, MASSACHUSETTS.

LASTING-MACHINE.

SPECIFICATION forming part of Letters Patent No. 422,734, dated March 4, 1890.

Application filed December 23, 1889. Serial No. 334,758. (No model.)

*To all whom it may concern:*

Be it known that we, GEORGE W. COPELAND, of Malden, and JOSEPH E. CRISP, of Somerville, both in the county of Middlesex and State of Massachusetts, and citizens of the United States, have made certain new and useful Improvements in Machines for Lasting Boots or Shoes; and the following specification describes and illustrates the same.

In lasting-machines as heretofore made the lasting-heads for the heel and toe have an oscillating motion to permit the heel and toe lasting plates, which move in such heads in lines parallel therewith, to conform to the varying angles of heel and toe relative to each other, and these heads are also fixed at some given height with reference to the side-lasting mechanism and are provided with downholds to resist the upward thrust of the last.

Our improvements consist, among other things, in fixing the last rigidly for the action of the toe and heel lasting plates without the usual heel and toe downholds and in raising the toe-lasting head so that the toe-lasting plates in their upward motion may serve to draw the leather which is around the toe up and over the last before they act to fold the leather down upon the inner sole; in providing the operative edges of the lasting-plates with auxiliary frictional surfaces of material more adhesive than metal; in so constructing the lasting-plates that they present an unbroken edge to the last and commence their folding action from the median line of the last, thus allowing them to start from any desired distance below the inner sole at the toe and move up as desired, and when folding the leather over to gather it more efficiently than if they started to fold from the sides of a downhold; in so mounting the lasting-plates that they can rock or be rocked to conform to the angles of toe and heel without changing the angular position of their carrying-heads; in giving the toe-lasting head positive rising and falling motions at the will of the operator, so that the head may be raised to allow the lasting-plates to pass over the upper and to fold it to the last, and so that these plates can be pressed down to iron smooth the wrinkles formed by the folding operation; in so connecting the mechanism for the toe-support that it is held rigidly below the last when in operative position and is lowered automatically to another rigid position when the machine is open to facilitate the entry of the lasts; in using chains which pass over the last and are fastened at their ends to the operating-levers, and in having the lasting-strap secured to those chains by ring-fastenings properly located.

Figure 20:
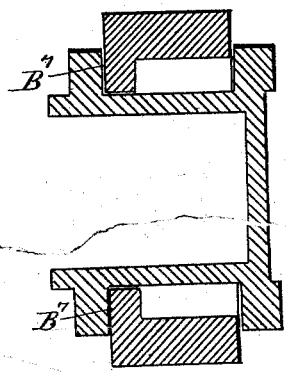
Figure 4:
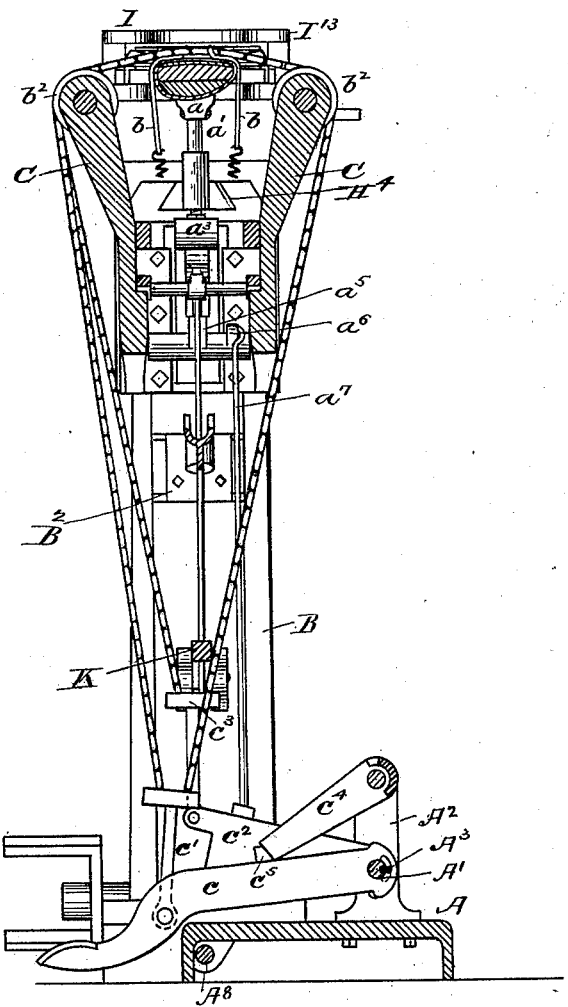
Figure 26:
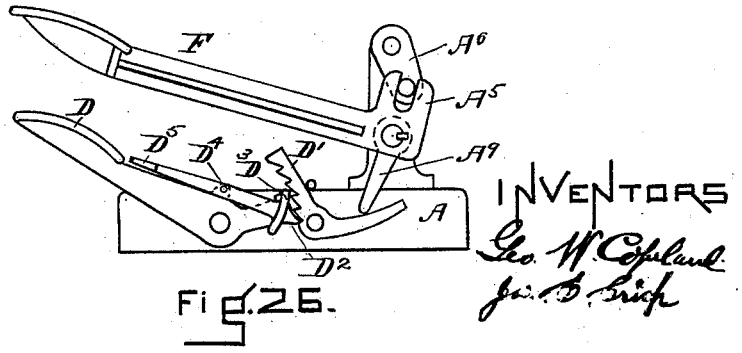
Figure 5:
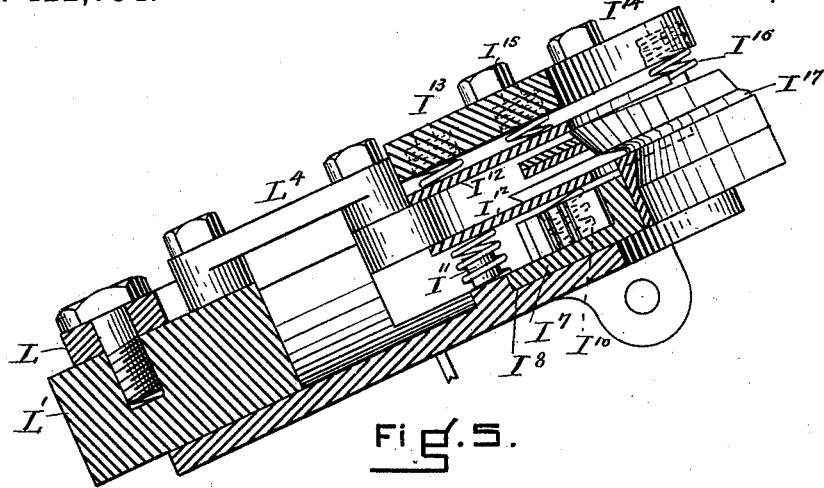
Figure 6:
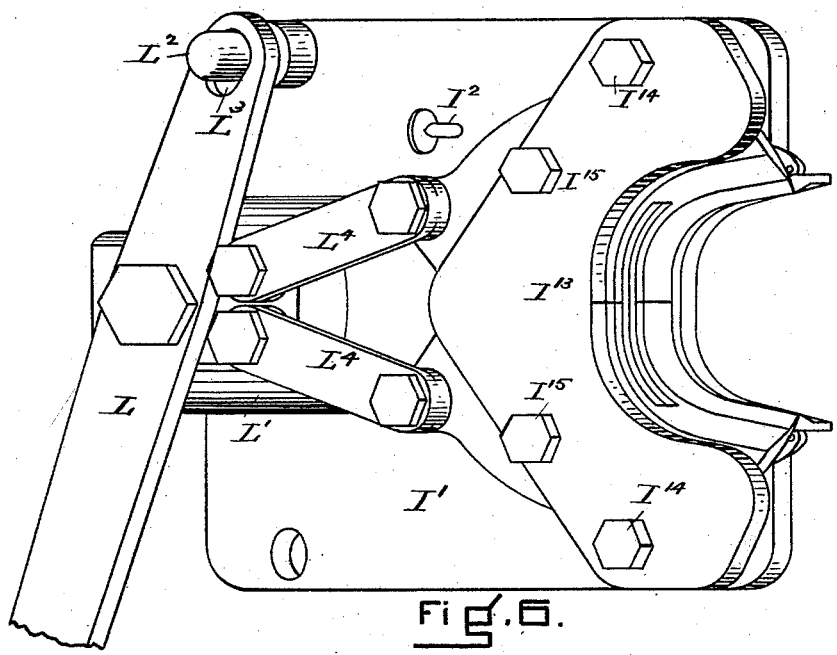
Figure 7:
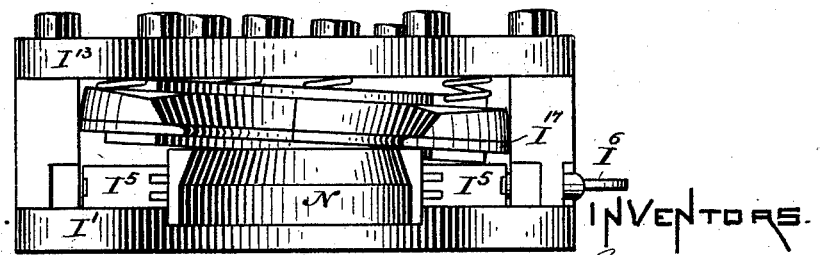
Figures 21, 23, 24:
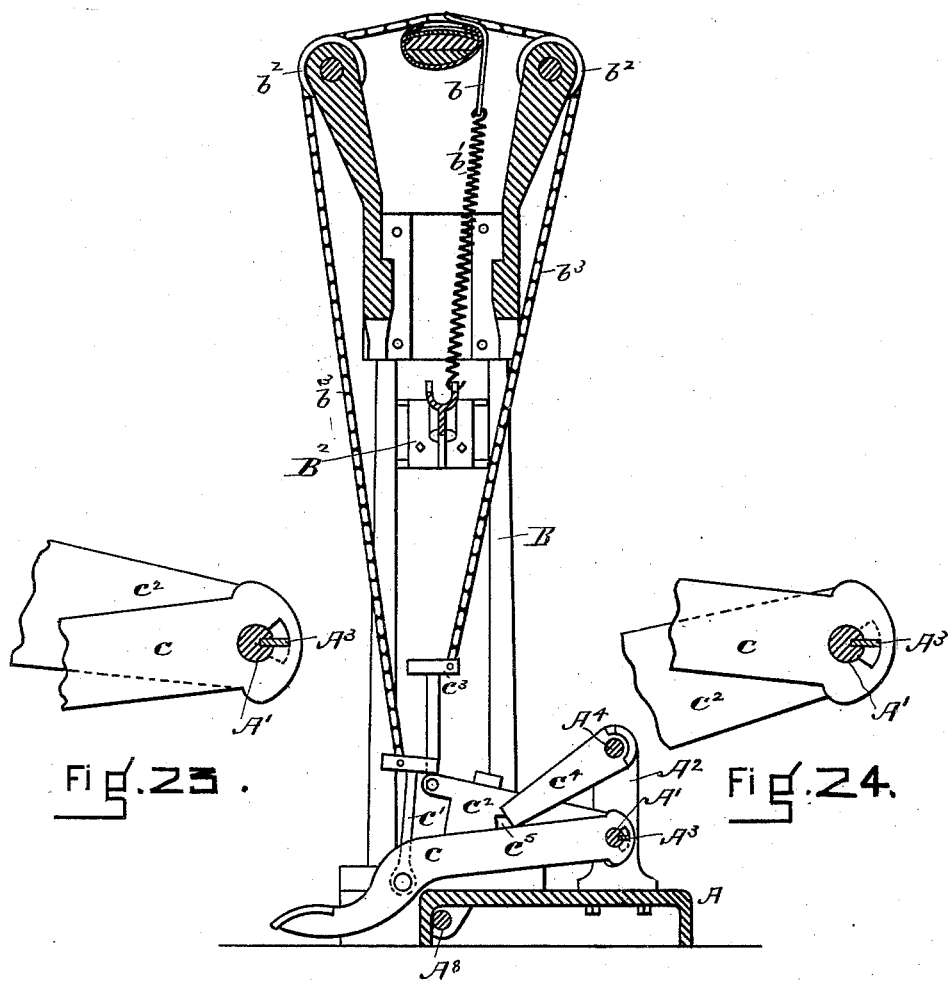
Figure 25:
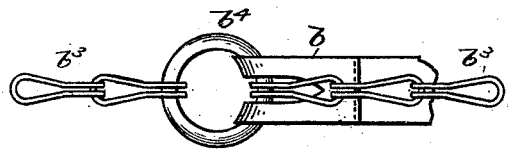
Figure 22:
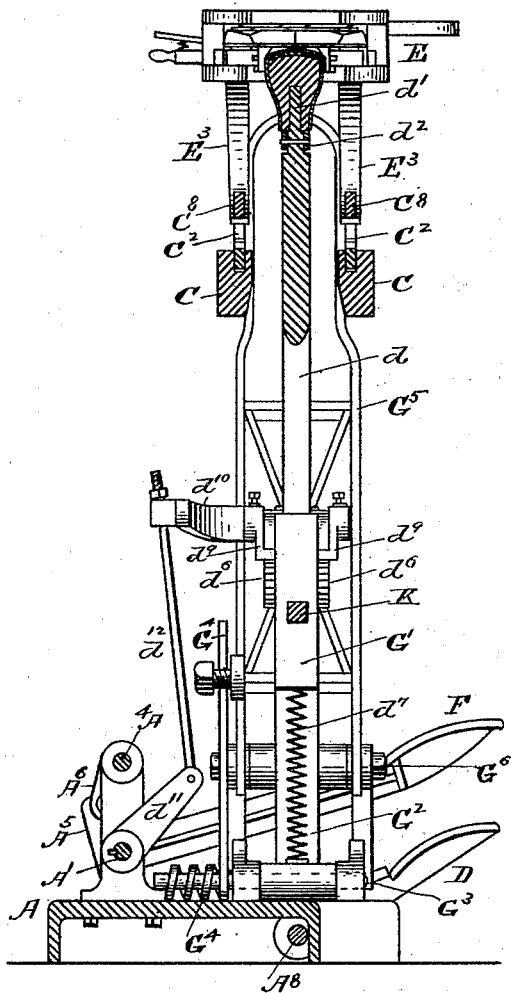

Figure 1 shows a side elevation of the machine when closed. Fig. 2 is a plan view thereof. Fig. 3 is a horizontal vertical section showing the machine open. Fig. 4 is a vertical cross-section looking toward the toe-lasting head. Fig. 5 is a longitudinal section of the toe-lasting head. Fig. 6 is a plan of Fig. 5. Fig. 7 is a front elevation of the toe-lasting head, showing the lasting-plates at extreme angular position. Fig. 8 is a plan of the toe-lasting head with the top plate and flat spring $I^{12}$ removed. Fig. $8^a$ shows the bell-crank levers $I^3$, carrying the band N. Fig. 9 shows in plan a lasting-plate and its attachments. Fig. 10 shows in plan the flat spring $I^{12}$. Fig. 11 shows in plan the top plate $I^{13}$. Fig. 12 is a front elevation of the lasting-plate, Fig. 9. Fig. 13 shows in section the rocking slide-block L'. Fig. 14 shows how additional frictional surface can be given the working-edges of the lasting-plates. Fig. 15 shows the frictional covering O. Fig. 16 shows in section the relation and shape of guide-rolls and guide-slots to each other. Fig. 17 is an enlarged cross-section looking toward the toe. Fig. 18 is a longitudinal section of the base carrying the toe-lasting head. Fig. 19 is a cross-section showing how the toe-rest is fitted in the U-shaped casting C. Fig. 20 shows the vertical slide-bearings for the base carrying the toe-lasting heads. Fig. 21 is a cross-section showing how one chain and one lasting-strap are operated. Fig. 22 is a cross-section looking toward the heel-lasting head and showing in partial section the jack-post. Figs. 23 and 24 show the relations of key and key-ways in treadles and counter-balances when in different positions. Fig. 25 shows the ring connecting the lasting-straps to the chains. Fig. 26 is an end view of the base A, showing connections of treadles D and F. Fig. 27 is a detached back side elevation of the casting C, showing the locking and revolving mechanism of $K^3$.

In this machine the side-lasting straps, the jack-post, the support for the heel-lasting devices, the base, and the heel and toe lasting bands are substantially the same as those of United States Letters Patent Nos. 365,504 and 365,505, and the various motions requisite for the lasting are all produced by manual labor.

A U-shaped casting C is secured to the post B at B' for the purpose of giving bearings to the parts, hereinafter described in detail.

The side-lasting devices, Figs. 1, 2, 4, 21, 23, 24, 25, and 26, are composed of pairs of straps $b$, arranged in substantially parallel lines to be drawn over the last when in position, and each pair of these straps are simultaneously drawn toward each other over the upper against the resistance of strong spiral springs $b'$, secured to their inner ends by the motion of foot-treadles in the following manner: Chain-guide rolls $b^2$ are suitably located upon center bearings fixed at C', an opposite pair of rolls for each strap, and over a pair of these guide-rolls is led the chain $b^3$, of sufficient strength to draw a side-lasting strap at all desired pressures. One end of this chain is secured to the treadle-connection $c'$ to the operating-treadle $c$, and the other end to the connection of the counter-balance $c^2$, the counter-balance $c^2$ and the treadle $c$ balancing each other. The result of these connections when the treadle $c$ and the counter-balance $c^2$ are alternately moved down is to cause that part of the chain over the bottom of the last to reciprocate. There is attached to that part of the chain which the treadle $c$ moves, a little past the center line of the last, the upper end of a side-lasting strap $b$ by a ring-connection $b^4$, Figs. 2 and 25, and when the operating-treadle $c$ is pressed down to its full extent, so that the gravity latch or pawl $c^4$ will engage with the catch $c^5$, it will always draw the side-lasting strap $b$ over the edge of the last to about the center thereof and hold it there and the upper under it until the latch $c^4$ is unfastened. The other strap $b$ of the pair is attached in the same manner to another chain $b^3$, which passes over other guide-rolls close to those of its mate, and whose ends are so connected to the same treadle $c$ and counter-balance $c^3$ that it will move simultaneously with its mate, but in opposite directions, thus causing the strain of the side-lasting straps to equalize each other.

Each pair of lasting-straps may be operated by its own treadle and counter-balance, or, as here shown, a treadle may be used for the two pairs operating over the shank and a treadle for the pair acting upon the ball of the last. A return-treadle F is used to raise the latches and operate the counter-balances when it is desired to spread the side-lasting straps for the removal of a last or placing another one under the over-crossing chains that operate the side-lasting straps, the straps themselves being drawn back close to the chain-guide rolls by the following mechanism: A shaft A', moving in bearings $A^2$ on the base-plate A, has fixed to its end the return-treadle F, and on the part of this shaft covered by the hubs of the strap-treadles and counter-balances, which alternate with each other, there is firmly fixed the long key $A^3$, and the keyways in the hubs of the strap-treadles are so positioned and widened that when the return-treadle F is at its lowest depression the key $A^3$ forms a stop, which limits the rise of the strap-treadles $c$, and when the return-treadle F is at its highest point the keyways in the strap-treadles $c$ are wide enough to allow the strap-treadles to be depressed and locked without changing the position of the return-treadle F. To raise the strap-treadles $c$ by the chains attached to them and to the counter-balances $c^3$, the keyways in the counterbalance-hubs are so located that when the return-treadle F is at its lowest depression the key $A^3$ presses against the side of the keyways which are employed to depress the counter-balances. These keyways are widened, so that the return-treadle at the commencement of its downward motion can unlock the gravity-pawls $c^5$, holding down the treadles $c$, by turning the shaft $A^4$, upon which shaft the pawls $c^5$ are mounted in a manner similar to the treadle and counter-balances. The connections $A^5$ and $A^6$, Fig. 26, cause the shaft $A^4$ to operate as desired. The return-treadle F and shaft A' also unlock simultaneously the other parts of the machine, as will be described in connection with those parts.

The spiral springs $b'$, attached to the inner end of the lasting-straps $b$, are each secured to the bar $B^2$ at such an angle to the parts of the last the straps work over as will insure the most efficient action to the straps, and the angle or fixture of these springs $b'$ is varied for different curvature of lasts.

To introduce and secure the last in position for the lasting process in the most convenient manner, the last is placed upon the jack-pin and swung toe foremost into the tunnel formed by the side-lasting straps and their operating-chains, the heel-lasting head gaining upon the last until said head is locked in correct position with reference to the side-lasting straps by mechanism constructed in the following manner, (see Figs. 1, 2, and 22:) Upon ears $A^7$, with prolongations formed on the base of the machine A, is pivoted the swinging arm G, having the sleeve G' in its upper end for reception of the jack-post $d$, and at its lower end, back of the center, it has the rest $G^2$, which by contact with the base-plate A limits the backward throw of the jack-post and the heel-lasting head. Around a prolongation of the pivot-pin $G^3$ is the torsional spring $G^4$, one end of which spring rests on the base and the other end is attached to the support for the heel-lasting head, the use of this spring $G^4$ being to balance and ease the swinging motions of said head and jack-post.

The support $G^5$, carrying the heel-lasting head, is pivoted to the swinging arm at $G^6$, the lower parts $G^9$ of which support engage with the prolongations of the ears $A^7$. By the engagement of these parts when the jack-post is swung forward or backward the heel-lasting head on said support $G^5$ is simultaneously moved in the same direction as the jack-post, but at a faster rate of speed.

The support for the heel-lasting head is locked in operative position and held rigidly against lateral motion by swinging between the spring-latches $C^2$, which latches are pivoted at $C^3$ to C, Fig. 18, and are pressed up to the catches $G^7$ by the springs $C^4$, Fig. 3. The rear end of these latches are prolonged over the cams $C^5$, mounted on C at $C^6$, and these cams by their connection $C^7$ to one of the counterbalance-levers separate the catches when the return-treadle F is actuated.

The heel-lasting head E is pivoted to its support at $G^8$, Fig. 3, and its angular position is adjusted and maintained by the adjusting screw-rod E' and spring $E^2$, Figs. 1 and 3. To firmly iron down the heel-seat by the lasting-plates when over it, the front part of the head has the projections $E^3$, which pass under the double-ended levers $C^8$, pivoted to C at $C^9$, and the opposite ends of these levers $C^8$ are pressed up by the rocking cross-bar $B^3$, Fig. 3, this cross-bar being operated by the properly-guided slide-rod $B^4$, connected to the crank $D^5$ by the links $D^6$, the crank $B^5$ being fixed to the long shaft $A^8$, mounted in and passing under the base of the machine A, Fig. 3, and having the treadle D fixed to its outer end, Figs. 21 and 26, so that the full depression of the treadle D will carry the lasting-plates in the lasting-head down any required distance, and, since it is requisite that the lasting-plates be locked down different distances and also be relieved from pressure during the lasting process, the pressure-treadle D is provided with the pawl $D^2$, that engages with the pivoted ratchet D', provided with segmental teeth, and as the pawl $D^2$ passes by the teeth of the ratchet it holds in whichever tooth it may be left, and to release the pawl from contact with the ratchet a segmental shield $D^3$ is so pivoted to the treadle D at $D^4$ and provided with a toe-piece $D^5$ that depressing the toe-piece $D^5$ to the level of the treadle D causes the shield to force the ratchet back against its spring and ride clear of the pawl on the shield. The ratchet D' is withdrawn from the pawl $D^2$ by the return-treadle F.

The ratchet D' is shaped somewhat like a bell-crank lever, and a projection $A^9$, Fig. 26, is attached to the shaft A', on which the return-treadle is fixed. When the return-treadle F is depressed, the projection $A^9$ swings the ratchet D' away from the pawl by acting on the end of the bell-crank lever.

To facilitate jacking, to accommodate various thicknesses of lasts and resist the pressure caused by ironing down heavy counters, the jack-post should have a wide range of adjustment together with absolute rigidity when locked in operative position. Efficient mechanism for these purposes is constructed as follows, Figs. 1, 3, and 22: The jack-pin d' and last-rest $d^2$ are pivoted to the top of the jack-post d, so that they may be fixed at any desired angle, and on the lower part of the jack-post, that is round, is cut the rack $d^3$, which intermeshes with the pinion-gear $d^4$, fixed to the short shaft $d^5$, mounted in suitable bearings on the swinging arm G. This short shaft carries ratchet-wheels $d^6$ at each end, outside of the swinging arm, the teeth of which are set one-half their spacing apart, so as to give fine adjustment. The jack-post is fitted to slide freely past the pinion in the sleeve G' and is prevented from rotation by the tops and bottoms of the teeth of the rack and pinion touching each other. Beneath the jack-post is the properly-guided spiral spring $d^7$, it being made of sufficient strength to balance the jack-post and a large-sized last, with the upper thereon, a little above the level of the lasting-plates when the machine is open. In the act of closing the machine the operator presses the last a little down, and the last passes under a gage for height formed on one end of the heel-lasting plates, and upon removal of the head after the machine is closed the spring $d^7$ raises the last up to the gage, and the pawls $d^8$, swung at $d^{13}$, drop into one or the other of the ratchet-wheels $d^6$, holding the last in that position as long as desired, the pivot of the pawls $d^8$ being the shaft $d^{13}$, on which, just outside of the pawls, are fixed the pawl-raisers $d^9$, operated by the return-treadle F, acting through levers $d^{10}$ $d^{11}$ and connecting-rod $d^{12}$, Fig. 22.

When positioning a last in this machine, it has been found advantageous to have the toe-support a dropped considerably below its operative position until the machine is locked together, and that the toe of the last should be so firmly pressed down upon the toe-support when in operative position that the raising of the toe-lasting plates in the act of forming the upper around the toe of the last cannot perceptibly change its height; and it has been also found best that the toe-support should always preserve its distance from the lasting-plates regardless of the length of the lasts, Figs. 1, 3, 17, 18, and 19. This is accomplished by causing the stem of the toe-support a' to slide freely in the sleeve H', Figs. 17 and 18, formed on the base H, supporting the toe-lasting head I, so that it will always move forward and back in unison therewith and at the same time allow the base H to move vertically as desired without varying the height of the toe-support a. An adjusting-screw $a^2$ is fitted under the stem of the toe-support, and this screw takes bearing upon the rigid inclined rest $a^3$, Fig. 18, the inclination of this rest causing the toe-support to rise as it is carried by the base H toward the heel-lasting head to meet the toes of shorter lasts, which lasts as they decrease in length usually grow thinner at the toe portion. Guideways for the rest $a^3$, fitted so that it will slide freely up and down, Fig. 19, are formed in the U-shaped casting C, attached to the post B, carrying the toe-lasting head A, and beneath the rest $a^3$, at $a^4$, is pivoted the cam or block $a^5$, Figs. 3, 4, 17, and 18, having as part of the same casting the crank $a^6$, and the crank $a^6$ is so connected to one of the counterbalance-levers $c^2$ by the rod $a^7$ that depressing the counterbalance-lever, as has been described, by the treadle F revolves the block sufficiently to allow the rest and toe-support to drop the distance required to another rigid support in order to give freedom of entry to the toe. Removal of pressure from the return-threadle F lets the spring $a^8$, Figs. 1 and 3, revolve the block $a^5$ in the opposite direction, and so raise and rigidly hold the toe-support in operative position. When this stage is reached, with the machine locked together the operator forces the last firmly back into the heel-lasting band by the brace K, Figs 1, 3, 22, and 27, pivoted to the post B at K' and acting against the sleeve G', carrying the jack-post $d$, which lever is operated by the handle $K^2$ and held in position by the ratchet $K^3$. This forcing back of the last causes the toe portion thereof to press down strongly upon the toe-support, and when the side-lasting straps are drawn over the center of the last, as they are before the toe portion is lasted, it is sufficient for all ordinary purposes. Pressure of the thigh against the handle $K^2$ removes it from contact with the ratchet $K^3$ and allows the lever K to drop when it is desired to open the machine. An auxiliary hold-down $K^8$, Figs. 1, 2, 17, 18, and 27, is provided, which may be used when the toe of the last is very thin or the leather is abnormally hard, and this rest is fitted to a bearing on $K^4$ on C, in which bearing it slides vertically and has partial revolution horizontally, and it is held up by the spiral spring $K^5$, Fig. 17, around its lowest part. This spring $K^5$ both raises and revolves the projecting part of the hold-down from over the shoe. Upon C at $K^6$ is pivoted the pawl $K^7$, whose lower end engages with a projection of the handle $K^2$ when said handle is raised, and on part of $K^8$ at $K^9$ are formed ratchet-teeth, which, when $K^8$ is swung over the last, engage with the ratchet-pawls $K^7$, Fig. 27. When the operator sees that the conditions are not favorable for the last remaining in position for toe-lasting, he swings this hold-down over the ball of the last and pushes it down, so that it will contact therewith, and the ratchet-teeth hold it there, and then the toe is lasted as before. Pressing out the handle $K^2$ causes the pawl $K^7$ to release the ratchet-teeth, and the hold-down moves up and swings from over the last automatically.

The toe-lasting mechanism, Figs. 1, 2, 3, and 18, is constructed in two parts—viz., a base with a horizontal and vertical movement, which positions the toe-rest correctly, the movements of which are produced by the hand-wheel $H^2$ and screw $H^3$ moving the base to and from the heel-lasting head, the base working in a dovetailed slideway $H^4$, and this slideway is moved vertically in other slideways formed upon the post B at $B^7$, Fig. 20, by the connecting-rod $B^8$, the crank $B^9$, the shaft $B^{10}$, and the double-ended treadle $B^{11}$, which moves the crank in either direction. Pivoted to this base at $H^5$ is the lower part or plate I' of the toe-lasting head, Figs. 1 and 3, and by the thumb-screw $I^2$ the inclination of the head can be set as desired. On this plate I' are pivoted the bell-crank levers $I^3$ by the bolt $I^{15}$, whose inner ends $I^4$ are formed as intermeshing segments giving common motion to each, Fig $8^a$, and at the outer ends of these bell-cranks are pivoted the links $I^5$, which in turn carry the metallic or chain part of the leather-lined lasting-band N, and to cause this band to conform to any curve of toe the thumb-screw $I^6$, Figs. 7 and 8, is used to regulate the distance between the ends of the levers $I^3$. The front of the plate I' is shaped out so as to clear the band in all positions, and a small slideway is made at $I^7$ for the center guide $I^8$ of the band to move in.

In the bell-crank levers at $I^9$ are pockets for the strong spiral springs $I^{10}$, and other similar springs are held in position by pins in their centers at $I^{11}$. Above and resting on these spiral springs is the flat spring $I^{12}$, Figs. 5 and 10, so shaped that the lasting-plates which rest thereon will have sufficient bearing when over the last. Another flat spring $I^{12}$ is placed above the lasting-plates, and spiral springs in line with those below are secured in the top plate $I^{13}$ of the head, Figs. 5 and 11, and these spiral springs are so near in line with the center or median line of the last that the lasting-plates confined between them can move or be moved as if on a center the distance required to conform to the cross-angle of the last and material to be folded over it.

The outer ends J' of the lasting-plates J, Figs. 8, 9, and 12, swing around their median points of contact $J^2$ as a common center, and in order to keep those points together at all positions of motions and against all forces their outer edges are curved, as at $J^3$, with $J^2$ as a center. The straight abutments $J^4$ are long enough to cover any desired forward motion of the center of the plates, and are firmly fixed between the plates I' $I^{13}$ by the bolts $I^{15}$, which serve to hold the plates together at those points, Figs. 5, 6, and 7. The arc $J^3$ of the lasting-plates is curved at right angles to their surfaces, also using $J^2$ as a center for those curves, as shown, Figs. 9 and 12. This last-mentioned curve allows the lasting-plates to rock within the head to the cross-angles of lasts and to still preserve contact with the abutments $J^{11}$. To insure the centers $J^2$ of these lasting-plates maintaining their level with each other, segments $J^5$, spring-tempered, are secured one to each plate. These segments interlock, as will be understood by Figs. 5, 6, 9, and 12, and assist the flat outside plates $J$ to preserve substantial parallelism of the lasting-plates at all points of motion. The segments $J^5$ also prevent one plate from running ahead of the other before they contact with the leather to be turned down. The operative motions of these lasting-plates consist of a forward motion of center and a simultaneous swinging in of the outer ends. To govern the relations of these motions to each other, the guide-slots $J^6$, of the desired angle and length, start from the guide-rolls $J^7$. The guide-rolls $J^7$, Fig. 16, are of correct length and shape to allow the lasting-plates to rock, as hereinbefore described. The bolts $I^{15}$, which assist in securing the top and bottom plates of the lasting-head together, also form the bearings for the rolls $J^7$ and the pivots for the bell-crank levers $I^3$, besides holding the flat plate-springs $I^{12}$ in position. To give motion to these lasting-plates, a lever $L$ of the second class is closely pivoted to the rocking slide-block $I'$, Figs. 3, 6, 8, and 13, with its fulcrum against the pin $L^2$, a slot $L^3$ giving the desired freedom of motion thereto. Closely pivoted to the rocking slide-block $L'$ and the lasting-plates $J$ are the links $L^4$, so that moving the lever up or down causes the lasting-plates to rock in unison therewith, and moving the lever forward or back causes corresponding motions of the lasting-plates. A correct bearing is formed for the rocking slide-block $L'$ on the lower part of the lasting-head, whose center of rotation corresponds with the rocking center of the lasting-plates, and by moving the fulcrum-pin $L^2$ from side to side the head I can be used either for heel or toe.

In Figs. 5, 7, and 12 it will be seen that the lasting-plates are slanted at their front ends, and spiral springs $I^{16}$, which do not contact with the slanted ends of the lasting-plates when back, are fixed in that part of the top plate of the head over the slanted front ends of the plates, thus enabling the lasting-plates to be easily rocked to the angle of the last when starting them over, and then causing their pressure to increase as they move on to their work. As it is requisite that the operative end of these lasting-plates conform in shape to that of the line of work they are used for, the usual removable end $I^{17}$ is fitted to them.

In order to give the lasting-plates a better frictional surface, leather or other similar material, Fig. 15, is attached above the working-edge of said plates. As shown in Fig. 14, the leather or similar material is placed above and projects beyond the edges of the plates, so that in the process of lasting the toe it is brought and held in contact with the upper at the toe part of the shoe until the plates commence to fold over the upper on the last, whether the plates are raised upward to come in contact with a shoe or the shoe is pressed down to come in contact with plates which have only a horizontal motion. The leather may be so made as to cover not only the upper surface of the plate, but also extend over and cover the working-edge. The leather used should be of sufficient stability for the desired purposes.

When the head is used upon the heel of the last, a gage $I^{18}$ for height is formed on one of the removable parts $I^{17}$. This gage is so cut under that it does not destroy the curved working-edge of the lasting-plates or start a wrinkle on the edge of the upper. The handle $M'$ and ratchet $M^2$ are substituted for the adjusting-screw of the toe-lasting band, and the point of pivoting the head is changed from $H^5$ to $G^8$, and the balancing-spring $E^2$ and pull-down bars $E$ attached, as hereinbefore described.

The operation of this machine is easily understood, and, commencing with the machine open, Fig. 3, is as follows: With an upper properly placed upon a last the operator takes it preferably in his left hand, near the heel, and places it upon the jack-pin, at the same time with his right foot pressing down the return-treadle $F$, and swings the last toe foremost under the chains that operate the side-lasting straps. When the toe nearly reaches the toe-lasting plates which were left in position after lasting the previous upper, the treadle $F$ is released, and as the last moves forward the toe-support moves up to operative position and the latches $C^2$ drop into place. At the same time the jack-post has raised the heel to the gage $M$, which forms a part of one of the heel-lasting plates and has there been locked. The operator next raises the brace $K$ to press back the jack-post, and about the same time swings the lever $M'$ around until the heel-band presses firmly around the counter of the upper. The ratchet $M^2$ holds the band in place. The next operation is to draw the leather well up by pinchers adapted to that purpose, and then the treadle operating one set of lasting-straps is depressed and locked. Next in turn the leather toward and at the shank of the foot is drawn up by the combined action of pinchers and the operator's fingers and the treadle moving the straps for that part depressed and locked. Turning his attention to the heel, the operator grasps the handle actuating the heel-lasting plates, and with his foot on the treadle $D$, feeling the top of the inner sole with the lasting-plate, draws them over. He increases the pressure upon the treadle $D$ as the plates move forward, and at the end of their motion, or when he has moved them as far over as desired, he presses the lever $D$ firmly down, and the graduated ratchet there holds the plates. To last the toe, the operator ascertains if the toe-lasting plates are in correct lineal position, and they will be if the preceding upper was of the same length. If not, a turn of the hand-wheel H² makes them so. If the leather looks extra hard or the toe of the last is very thin, the auxiliary downhold K⁸ is swung over the ball of the last and pressed down, and then with the fingers of his right hand or with a suitable device for that purpose the operator presses the upper away from the last over and against the toe-lasting plates, at the same time feeling the toe-lasting plates up to and against the upper round the toe of the last so that they fairly and pretty closely touch it, using the left hand upon the lever of the toe-lasting plates for that purpose, and also to rock those plates to the angle of the toe of the last. The toe-lasting head is raised by the elevating end of the double-ended treadle B¹¹, thus by the movements already described drawing the leather tightly around the toe of the last. When the toe-lasting plates are high enough to pass over the inner sole, they are drawn over, and as the toe-lasting band has embraced the toe just below the line of action of the lasting-plates the bend or corner is well formed. If the operator thinks that the weight of the toe-lasting head and attachments is not sufficient to properly iron down the upper, he passes his foot to the opposite or depressing end of the treadle B¹¹ and forces the lasting-plates down as much as is desirable. The upper is now ready to be fastened by tacks or pegs, or both, as the class of work requires. After fastening, the operater grasps the shoe as at starting, and by pressing down the treadle F he releases and returns to their starting positions, as has been described in detail, all operative parts that have been used to act during the lasting process. The hold-down K⁸ and brace K he has already relieved during the fastening operation by pressing against the handle K² when he passed it while driving the fastening.

Having thus fully described the nature and construction of our improvements, we claim and desire to secure by Letters Patent of the United States—

1. In a lasting-machine, a toe-lasting head carrying toe-lasting devices adapted by means, substantially as described, to be moved bodily in a vertical direction with reference to the toe of a last fixed in front of it, whereby the lasting devices carried by said head may be raised above or lowered below the surface of an insole on said last, for the purpose set forth.

2. In a lasting-machine, the toe-lasting head I, carrying lasting devices, in combination with the crank B⁹ and its connecting-rod B⁸ and a suitable operating-lever, substantially as discribed.

3. In a lasting-machine, the toe-lasting head carrying lasting devices, connecting-rod, and crank, in combination with the double-ended foot-treadle B¹¹, all substantially as and for the purposes shown and described.

4. In the head of a lasting-machine, the combination of lasting-plates having an unbroken working-edge with springs between which said plates are moved, whereby the plates will conform to the angle of the heel or toe presented for lasting without changing the angle of said lasting-head, substantially as described.

5. In a lasting-machine, a head having plates supported by springs above and below them, so as to swing about a point in the median line of said head when folding over the upper upon the last, substantially as described.

6. In the head of a lasting-machine, the combination of the lasting-plates J, the springs I¹⁰ and I¹², supporting said lasting-plates and so as to give them a tipping or floating motion, all arranged and operating substantially as set forth.

7. In the head of a lasting-machine, the combination of the lasting-plates J and the abutments J⁴, substantially as and for the purpose shown and described.

8. In the head of a lasting-machine, the combination of the lasting-plates J, having guide-slots J⁶, with the guide-rolls J⁷ and side abutments, arranged and operating substantially as shown and described.

9. In a lasting-machine, a toe-support fitted to slide in a sleeve formed on the base of the toe-lasting head, in combination with an inclined rigidly-supported rest beneath said toe-support, substantially as described.

10. In a lasting-machine, a toe-support fitted to slide in a sleeve formed on the base of the toe-lasting head, in combination with its adjusting-screw $a^2$, substantially as described.

11. The combination, in a lasting-machine, of a toe-support, a sleeve formed on the base of the toe-lasting head and an inclined rest with a cam or block for raising and lowering said rest, substantially as shown and described.

12. In a lasting-machine in which the last is presented to the toe-lasting mechanism by being swung into position on a hinged support, a brace pivoted to the post supporting the toe-lasting head, by which the last is forced against the heel-band and at the same time down upon the toe-support, in combination with such band or support, substantially as shown and described.

13. In a lasting-machine, a lasting-head having a flexible embracing-band carried upon segmentally-connected bell-crank levers, and the thumb-screws I⁶ and block J⁴, for adjusting and maintaining the relation of the bell-crank levers with each other, substantially as described.

14. In a lasting-machine, a toe-lasting head, in combination with the lasting-plates, an auxiliary frictional covering of leather or analogous material secured to and projecting beyond the edges of said plates, substantially as specified, which presses and forms upon the last the material to be lasted before the lasting-plates commence their folding action, as described.

15. In a lasting-machine, heel-lasting plates hinged to each other, substantially as described, to form a practically continuous surface when closed, having a gage with an undercut portion formed on one of said plates for determining the proper height of the last, substantially as set forth.

16. In a strap-lasting machine, the combination of strap-drawing chains passing over guide-rolls from actuating-treadles to counterbalance or return levers, with side-lasting straps attached to said chains by ring-fastenings, substantially as described.

GEO. W. COPELAND.
JOS. E. CRISP.

Witnesses:
MARY E. WOODBURN,
JOHN L. S. ROBERTS.